United States Patent
White

[11] Patent Number: 5,920,672
[45] Date of Patent: Jul. 6, 1999

[54] OPTICAL CABLE AND A COMPONENT THEREOF

[75] Inventor: Kevin T. White, Hickory, N.C.

[73] Assignee: Siecor Corporation, Hickory, N.C.

[21] Appl. No.: 08/869,819

[22] Filed: Jun. 5, 1997

[51] Int. Cl.⁶ ............................................. G02B 6/44
[52] U.S. Cl. .......................................... 385/110; 385/113
[58] Field of Search ................................. 385/100–114

[56] References Cited

U.S. PATENT DOCUMENTS

| | | | |
|---|---|---|---|
| 4,401,366 | 8/1983 | Hope | 350/96.23 |
| 4,550,976 | 11/1985 | Cooper et al. | 350/96.23 |
| 4,703,998 | 11/1987 | Uchioke et al. | 350/96.23 |
| 4,781,434 | 11/1988 | Kitagawa et al. | 350/96.23 |
| 5,087,110 | 2/1992 | Inagaki et al. | 385/110 |
| 5,243,675 | 9/1993 | Kathiresan et al. | 385/109 |
| 5,487,126 | 1/1996 | Oestreich et al. | 385/105 |

FOREIGN PATENT DOCUMENTS

| | | | |
|---|---|---|---|
| 0382144B1 | 8/1994 | European Pat. Off. | G02B 6/44 |
| 07056066 | 3/1995 | Japan | G02B 6/44 |
| 0715195 | 6/1995 | Japan | G02B 6/44 |

*Primary Examiner*—Hung N. Ngo
*Attorney, Agent, or Firm*—Timothy J. Aberle

[57] ABSTRACT

A fiber optic cable (40) having an fiber optic cable component (10) with a cellularized structure. The fiber optic cable component (10) comprises a body (11) made from a cellularized material having at least one recess (13). The recess (13) includes an optical member (44), and the body (11) is surrounded by a protective sheath (45).

27 Claims, 2 Drawing Sheets

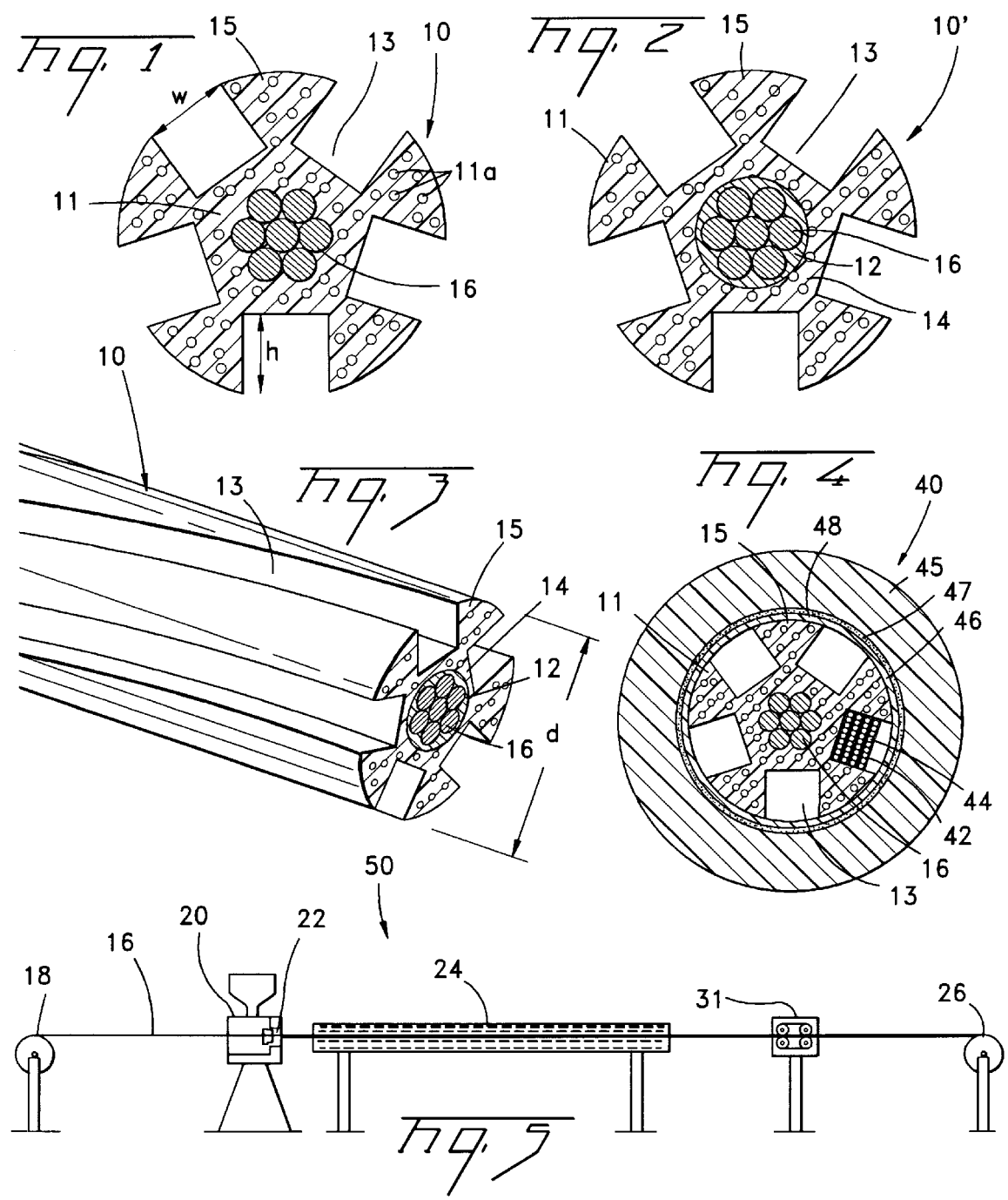

OPTICAL CABLE AND A COMPONENT THEREOF

FIELD OF THE INVENTION

The present invention relates to an optical fiber cable having a component for supporting a plurality of optical fibers, and to a method of making the same.

BACKGROUND OF THE INVENTION

A conventional optical fiber cable product may comprise a plurality of optical fibers supported in a fiber optic cable component, for example, a spacer body. The spacer body is formed of a thermoplastic material and is provided with a structural surface. The surface may comprise a plurality of recesses. The recesses are adapted to receive and retain optical fibers therein. The recesses must conform to product specifications so that the fibers will not be over-stressed. Undue bending stresses, induced in the fibers from recesses which do not conform to specifications, may negatively affect the ability of the fibers to transmit signals. Additionally, the spacer body should be of specified tensile and crush strengths, and comprise a suitable number of recesses. The spacer body may comprise a central member, for example, a member for imparting strength and/or anti-buckling to the fiber optic cable product. Where the spacer body includes such a strength member, product specifications may require that the ratio of the diameter of the strength member to the root diameter is maintained. The root diameter is the minimum diametrical distance between the respective bottoms of opposing recesses.

A conventional spacer body is made by extruding a hot, molten thermoplastic material. A tool, termed an extrusion die, is used in the extrusion process. The die can be stationary or rotary, but will comprise a die opening through which the thermoplastic material is extruded under pressure. The opening will form the shape of the outer surface of the thermoplastic material during extrusion. As the spacer body cools, the thermoplastic material hardens into an essentially final shape. The final shape should conform to a set of product specifications.

However, formation of the spacer body surface according to desired product specifications may be difficult. A substantially deformed spacer body profile will not meet product specifications. A primary contributor to distortion is gravity, which may distort the soft mass of material after the extrusion process but before cooling of the spacer body especially in the case of spacer bodies of large cross-section. Such deformation is termed slumping.

Conventional methods for forming fiber optic cable components are relatively expensive. U.S. Pat. No. 4,814,133 relates to a method of forming the spacer of an optical fiber cable. The spacer includes a strength member, which is covered by a spacer body of thermoplastic material. The spacer body is made up of an intermediate layer which surrounds the strength member, and an outer layer which surrounds the intermediate layer. The two-layer design adds to manufacturing costs. U.S. Pat. No. 4,781,434 describes a method for forming the spacer of an optical fiber cable including the steps of providing a strength member and covering it with a spacer body. The process of manufacture is costly because a technique-sensitive die is used to maintain close tolerances. The foregoing methods are disadvantageous in that they are not cost efficient and may produce fiber optic cable components which are subject to a high degree of slumping.

SUMMARY OF THE INVENTION

In view of the foregoing, it is an object of the present invention to provide a fiber optic cable component which is produced according to product specifications.

It is another object of the present invention to provide a fiber optic cable component with reduced deformation of the surface thereof.

It is a further object of the present invention to provide a fiber optic cable component with a cellularized structure.

It is another object of the present invention to provide a fiber optic cable component with reduced slumping effects.

It is an object of the present invention to provide a relatively lighter fiber optic cable component.

The cable product of the present invention comprises a fiber optic cable component, the fiber optic cable component comprises a body, the body comprises a material having at least one recess having an optical member therein, at least a portion of the material comprises a cellularized structure, and the component is within a sheath.

A method of making an optical cable according to the present invention comprises the steps of:

(a) providing an extruder with a die;

(b) feeding a polymeric material into the extruder and heating the material to form a melt;

(c) mixing the material with a cellularizing agent;

(d) extruding the melt about a central member;

(e) forming at least one optical member recess in the material with the die as the material is extruded about the central member;

(f) whereby the melt is cellularized about the central member upon exiting from the extruder; and (g) placing an optical member in at least one of the recesses.

Alternatively, the cellularizing agent may be a foaming agent added to the polymeric material prior to the extrusion process.

BRIEF DESCRIPTION OF THE DRAWINGS

FIG. 1 is a cross-sectional view of a first embodiment of a fiber optic cable component according to the present invention.

FIG. 2 is a cross-sectional view of a second embodiment of a fiber optic cable component according to the present invention.

FIG. 3 is an isometric view of the fiber optic cable component of FIG. 2.

FIG. 4 is a cross-sectional view of a fiber optic cable product according to the present invention comprising the fiber optic cable component of the embodiment of FIG. 1.

FIG. 5 is a schematic view of an apparatus for forming a fiber optic cable component and a fiber optic cable product according to the present invention.

DETAILED DESCRIPTION OF THE INVENTION

Figure 6:
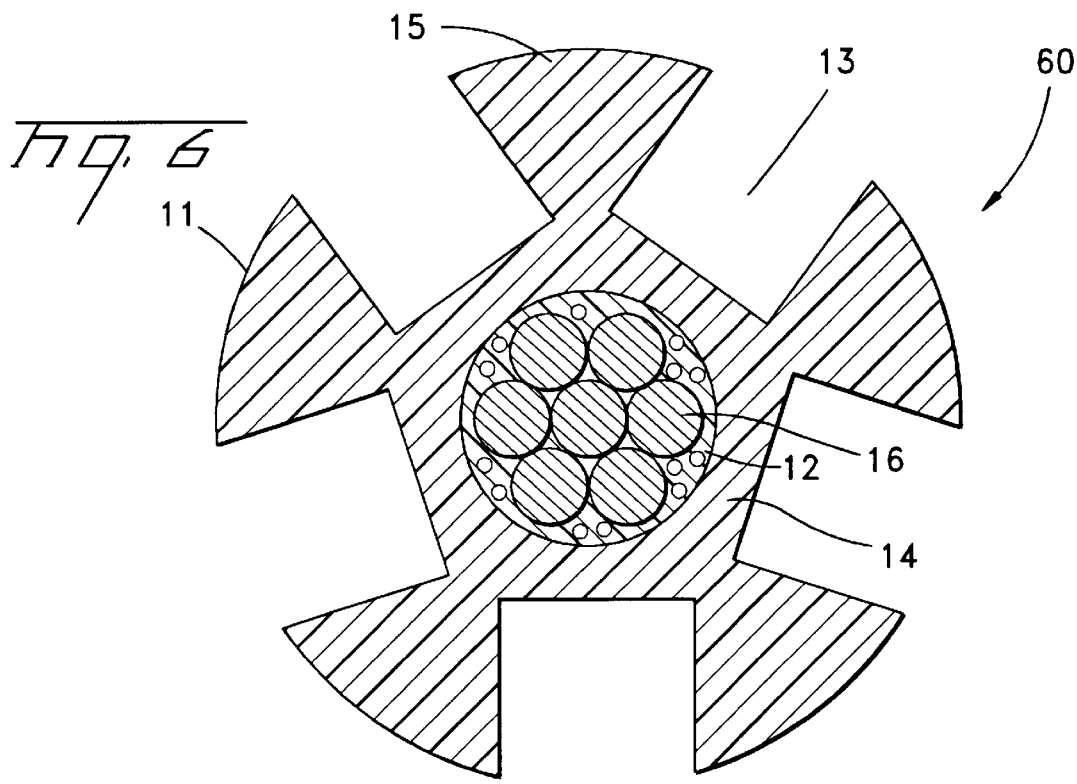
FIG. 6 is a cross sectional view of a fiber optic cable component according to the present invention.
Figure 7:
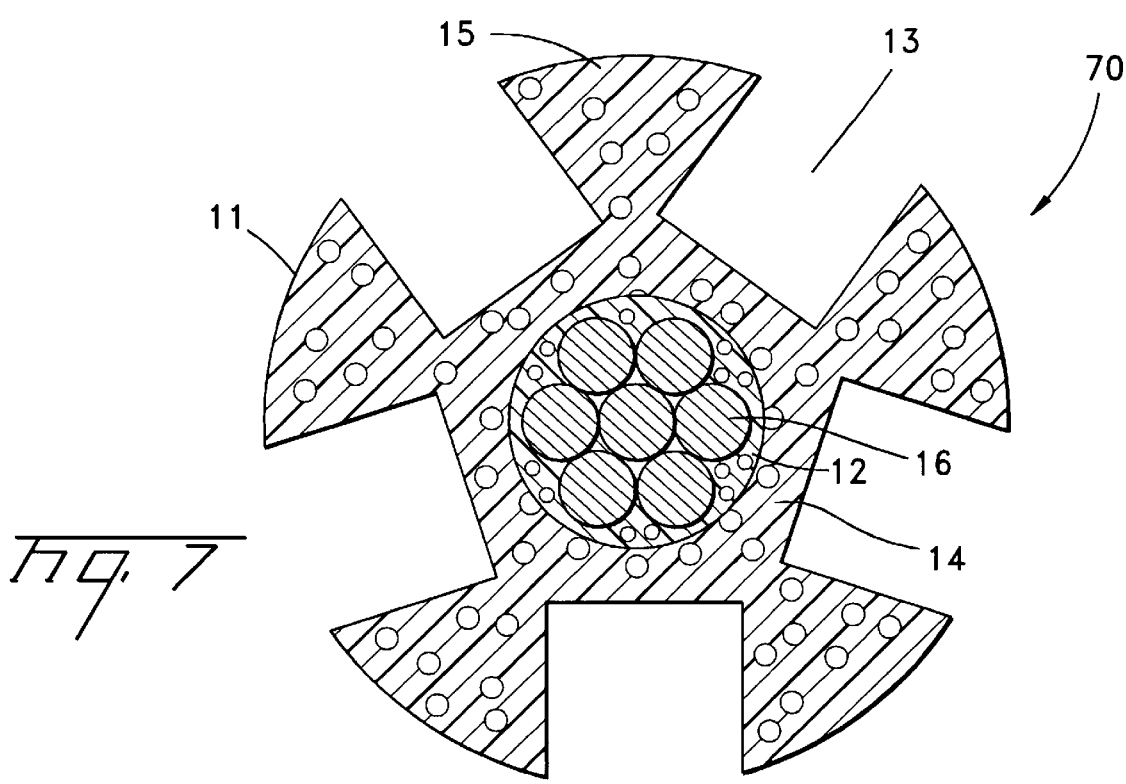
FIG. 7 is a cross sectional view of a fiber optic cable component according to the present invention.

Referring to FIG. 1, a fiber optic cable component 10 according to a first embodiment of the present invention will be described. Fiber optic cable component 10 includes a body 11 having a surface, for example, a surface comprising recesses 13 formed therein for receiving optical members. Each recess 13 may comprise a given width w and a height h. Ribs 15 are located between recesses 13. Additionally, body 11 may comprise a central member, for example, a central member comprising a stranded steel strength member 16. Alternatively, strength member 16 may be a single steel rod, or a glass or aramid yarn reinforced plastic material. In a preferred embodiment of the present invention, body 11 is cellularized, for example, it comprises unconnected cells 11a in a plastic matrix. Cells 11a comprise, for example, gas-filled cells. Another embodiment of the present invention comprises a fiber optic cable component 10' having a body 11 with an inner layer 12 and an outer layer 14. Either or both of the layers 12,14 may be cellularized (FIGS. 6–7).

The cellularized structure of body 11 may be formed by mixing a polymeric material with a cellularizing agent. The cellularizing agent may, for example, comprise: a conventional pre-mixed chemical foaming agent; a gas dissolved in the melt under high pressure which becomes undissolved upon a pressure drop to normal pressure after the extrusion process; or a volatile liquid dissolved in the melt which will change into a gas at the high temperature of the melt after the extrusion process when the pressure returns to atmospheric. Alternatively, the cellularizing agent may comprise solid or hollow particles formed of glass, carbon, metal, ceramics, polymers, or resins. Preferred conventional polymeric materials include polyolefins, for example, polypropylene or polyethylene. An example of a chemical foaming agent is a Celogen AZNP130 agent made by Uniroyal. An example of a material with a pre-mixed chemical foaming agent is a DHDA8885 material made by Union Carbide. Alternatively, body 11 may be cellularized by injecting a cellularizing agent comprising a compressed gas or a volatile liquid material into the extruder during the extrusion process. Suitable materials comprise butane, pentane, nitrogen, or hexane. Moreover, body 11 may be cellularized by providing a matial having solid or hollow filler particles for example, glass microspheres, mixed therein.

FIG. 4 shows a product made in accordance with the present invention, for example, an optical cable product 40. Optical cable 40 includes optical members, for example, optical fibers 42. Optical fibers 42 are contained in optical fiber ribbons 44 which are disposed in a recess 13. Body 11 is surrounded by a water swellable material 46. Water swellable material 46 is surrounded by a jacket 47, which in turn is surrounded by an armor tape 48, and armor tape 48 is surrounded by a durable outer sheath 45.

Referring now to FIG. 5, a manufacturing line 50 for making fiber optic cable component 10 according to the present invention will be described. Manufacturing line 50 comprises: a pay-off reel 18; a cross-head 20; a rotary die 22; a cooling trough 24; a capstan 31; and a take-up reel 26. Rotary die 22 comprises a cross section which corresponds to the desired shape of component 10 including the recesses 13. The extrusion temperature of cross-head 20 is set at about 140° C. to about 200° C.

In operation of manufacturing line 50, strength member 16 is fed from a reel 18 into cross-head 20. Cross-head 20 encloses a melt mixture comprising plastic material and a cellularizing agent, the agent is added to the material in the extruder chamber or is pre-mixed with the material prior to entry into the extruder. As strength member 16 passes through cross-head 20, the melt mixture is extruded thereon. During this process, rotating die 22 shapes the melt into a body 11.

Next, cooling trough 24 cools body 11 into a solid fiber optic cable component 10. Fiber optic cable component 10 is then received by a take-up reel 26. To produce a two-layer spacer body as shown in FIG. 2, first layer 12 and second layer 14 are formed about strength member 16 in separate extrusion operations.

To make optical cable 40, component 10 is fed into a conventional fiber optic cable manufacturing line. Optical fiber ribbons 44 will be stranded into respective recesses 13. Body 11 is surrounded by a water swellable material 46. Water swellable material 46 is surrounded by a jacket 47, which in turn is surrounded by an armor tape 48, and armor tape 48 is surrounded by a durable outer sheath 45.

Typically, from about 0.05% to about 3 wt % chemical foaming agent is incorporated into the polymer to produce a foamed plastic material which is up to about 50% gas-filled voids. Preferably, up to 20% of the material of component 10 is gas-filled voids. Closed cells are the preferred cell configuration of the present invention.

Component 10 of the present invention has many advantages. Since body 11 comprises one or more layers having a cellularized structure, fiber optic cable component 10 will be relatively lighter for a given diameter, than conventional fiber optic cable components. A greater length of cable 40 can be put on a reel because of the relatively lower weight. Moreover, because the density of the foamed plastic is relatively lower, slumping effects and distortions of the surface of component 10 will be reduced during extrusion. Therefore, fiber optic cable component 10 will most often conform to product specifications. Additionally, cellularized components made according to the present invention will be less expensive to manufacture.

Persons of skill in the art will understand that the foregoing embodiments of the present invention are intended to be illustrative rather than limiting. Moreover, persons of skill in the art will understand that variations can be made to the present invention without departing from the scope of the appended claims. For example, although recesses 13 comprise a generally rectangular cross sectional shape, they may comprise such other cross sectional shapes as are suitable for receiving optical cables or fibers. Moreover, as shown in FIG. 3, the lay of recesses 13 may be helical; however, other lay configurations may be used as well, for example, an S-Z stranded lay configuration.

Accordingly, what is claimed is:

1. A fiber optic cable product comprising:
   (a) a fiber optic cable component, said fiber optic cable component comprises a body;
   (b) said body comprises a material having at least one recess, said recess includes an optical member therein;
   (c) at least a portion of said material comprises a cellularized structure; and
   (d) said fiber optic cable component is in a cable sheath.

2. The fiber optic cable product of claim 1, wherein said cellularized structure comprises part of a matrix.

3. The fiber optic cable product of claim 1, wherein said cellularized structure comprises gas-filled cells.

4. The fiber optic cable product of claim 1, wherein said body comprises an inner layer and an outer layer, at least one of said layers comprises said cellularized structure.

5. The fiber optic cable product of claim 1, wherein said body comprises a central member therein.

6. The fiber optic cable product of claim 5, wherein said central member comprises a strength member.

7. A fiber optic cable component for use in supporting optical members, comprising:
   (a) a body;
   (b) said body comprises a material having at least one recess for receiving an optical member therein; and
   (c) at least a portion of said material is cellularized.

8. The fiber optic cable component of claim 7, wherein said cellularized material comprises a matrix of cells.

9. The fiber optic cable component of claim 7, wherein said cellularized material comprises gas-filled cells.

10. The fiber optic cable component of claim 7, wherein said body comprises an inner layer and an outer layer, at least one of said layers comprises said cellularized material.

11. The fiber optic cable product of claim 7, wherein said optical member comprises at least one optical fiber ribbon.

12. A fiber optic cable comprising:
 a body with at least one groove receiving at least one optical fiber therein;
 at least a portion of said body including a cellularized polymeric material, the cellularized polymeric material is formed by mixing a polymeric material with a cellularizing agent and extruding the mixture whereby said mixture when cured defines a cellularized structure in said body portion.

13. The fiber optic cable of claim 12, said cellularizing agent comprising a chemical foaming agent.

14. The fiber optic cable of claim 12, said cellularizing agent comprising a gas dissolved in the polymeric material.

15. The fiber optic cable of claim 12, said cellularizing agent comprising a volatile liquid.

16. The fiber optic cable of claim 12, said cellularizing agent comprising particles.

17. The fiber optic cable of claim 16, said particles being solid or hollow and selected from the group consisting of glass, carbon, metal, ceramics, polymers, and resins.

18. The fiber optic cable of claim 12, said cellularizing agent comprising a gas injected during extrusion.

19. The fiber optic cable of claim 18, said injected gas selected from the group consisting of butane, pentane, nitrogen, and hexane.

20. The fiber optic cable of claim 12, said cellularized structure including up to about 50% gas filled voids.

21. The fiber optic cable of claim 12, said cellularized structure comprising closed cells.

22. The fiber optic cable of claim 12, said body including separate layers of polymeric material.

23. The fiber optic cable of claim 22, one of said layers is adjacent a strength member and includes said cellularized structure.

24. The fiber optic cable of claim 22, one of said layers is an outer layer and comprises said groove and said cellularized structure.

25. The fiber optic cable of claim 12, said cellularized structure comprising unconnected cells in a plastic matrix.

26. The fiber optic cable of claim 12, said body including a strength member.

27. The fiber optic cable of claim 12, said strength member comprising steel or a glass or aramid yarn reinforced plastic material.

* * * * *